Figure 1:
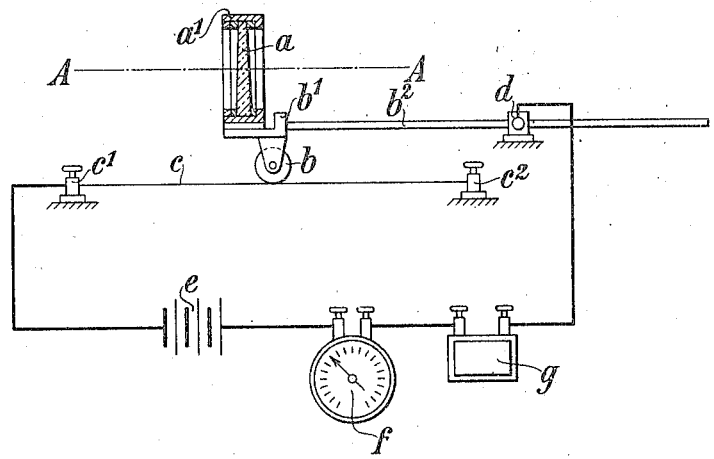

O. EPPENSTEIN.
INDICATING DEVICE FOR TELEMETERS.
APPLICATION FILED APR. 8, 1915.

1,158,191.

Patented Oct. 26, 1915.

UNITED STATES PATENT OFFICE.

OTTO EPPENSTEIN, OF JENA, GERMANY, ASSIGNOR TO THE FIRM OF CARL ZEISS, OF JENA, GERMANY.

INDICATING DEVICE FOR TELEMETERS.

1,158,191.  Specification of Letters Patent.  Patented Oct. 26, 1915.

Application filed April 8, 1915. Serial No. 20,071.

*To all whom it may concern:*

Be it known that I, OTTO EPPENSTEIN, a citizen of the German Empire, residing at Jena, Germany, have invented a new and useful Indicating Device for Telemeters, of which the following is a specification.

The invention relates to an indicating device for telemeters having the base-line within the instrument, in which the distance to be measured is determined by setting a measuring device, the movement of which effects a mutual displacement of two images presented to the observer and takes place essentially proportional to the quantity of the angle of the triangulation at the aim. If in such telemeters the measuring device is direct connected with a scale divided according to the distance, an unequal division of the scale is the result as it is well known that the distance to be determined is inverse proportional to the angle at the aim.

The invention permits to replace this unequal scale in a simple way without mechanical means of transmission by an equally divided scale or to connect it with such, viz., to transfer the movement of the measuring device into a quantity proportional to the distance to be measured. This is obtained by connecting the measuring device with a variable electric resistance in such a way that the quantity of the resistance alters in proportion to the movement of the measuring device. In different ways a transformation of the quantity of this variable resistance can then be effected into a corresponding quantity of inverse proportion.

A particularly simple arrangement is effected by putting the variable resistance into a circuit, passed by a current of constant tension. With such an arrangement, as is well known, the produced strength of the current is always inverse proportional to the existing resistance, that is to say, the strength of the current means practically a quantity proportional to the distance. It is only necessary to put into the circuit an instrument for measuring the strength of the current and having an index moving in proportion to the strength of the current, the scale being divided direct according to the distance. Such an indicating device offers the further advantage to allow the reading scale to be fixed at any place, even at a distance, and it is possible to put into the circuit several reading instruments and to provide by this means a telemeter with several reading scales, which can be read simultaneously. The adjustment of the indicating device can be made by altering the quantity of an additional resistance put into the circuit. If no current of constant tension is at hand, the transformation of the variable resistance into a reciprocate quantity can be effected by means of a Wheatstone bridge. If in a Wheatstone bridge two opposite branches have constant resistance and the resistance in the two other branches is altered, the product of the resistance in the two other branches must always remain constant if the zero line of the bridges is to remain without current; therefore in these two branches the resistance of the one must be inverse proportional to that of the other. For this reason the resistance influenced by the measuring device of the telemeter will be arranged as branch of a Wheatstone bridge with which two branches of constant resistance are connected, while the fourth branch of the bridge opposite the first branch is provided with a resistance of adjustable quantity. Care must then be taken by altering the resistance in the fourth branch, that the zero line of the bridge remains always without current; if this is the case the resistance in the fourth branch represents a quantity proportional to the distance to be measured. If the resistance of the fourth branch is formed of a wire of constant section, the wire may be fitted with a scale, divided direct according to the distance. In this case again the reading scale with the resistance belonging to it may be fixed at any place desired. For purposes of adjustment it is sufficient to alter the quantity of any resistance of the bridge. The adjustment of the resistance in the fourth branch of the bridge may take place automatically by putting a relay in the zero line of the bridge, which, as soon as the current passes the zero line, actuates a device increasing or diminishing the resistance in the fourth branch according to the direction of the current in the zero line.

In the drawing two constructional examples of the invention are each shown diagrammatically.

Figure 2:
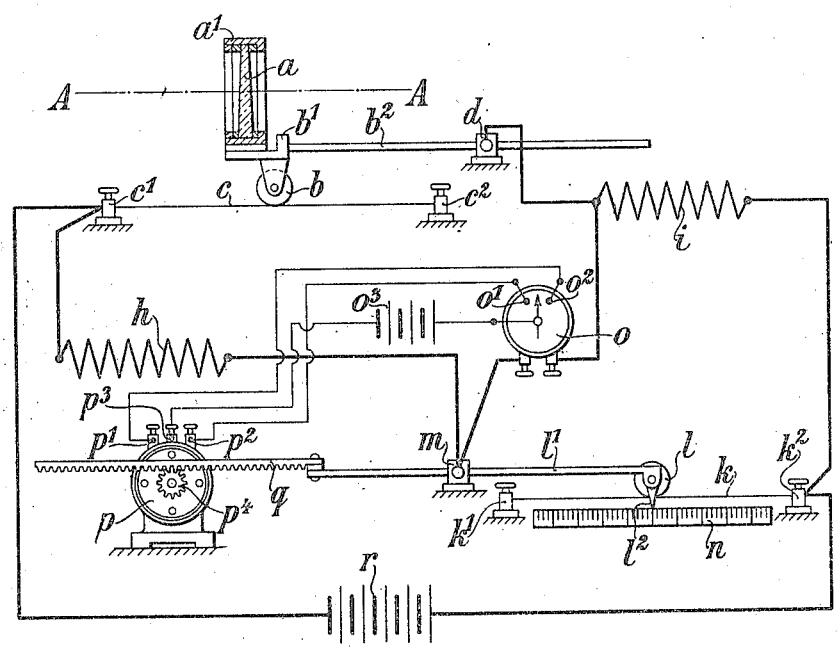

Figure 1 relates to an arrangement in which the resistance influenced by the measuring device of the telemeter alters the strength of a current of constant tension. Fig. 2 shows an example in which this resistance is being transformed by means of a Wheatstone bridge into a resistance inverse proportional to the first.

In both figures a telemeter is dealt with in which the measuring device is formed by a glass wedge $a$ disposed displaceably in the direction of the optical axis of the telemeter, the axis being indicated by the dotted line A—A. The mounting $a^1$ of the glass wedge $a$ is in both figures connected with a pulley $b$, which in case the glass wedge $a$ is displaced, can roll along a resistance wire $c$ stretched between two binding screws $c^1$ and $c^2$. On the bearing $b^1$ of the pulley $b$, a rod $b^2$ of conducting material is fixed which can slide in a fixed guide $d$. If a current is put in circuit at the binding screw $c^1$, it flows according to the position of the pulley $b$ and therefore of the glass wedge $a$ through a corresponding part of the wire $c$ and then through the pulley $b$ and the sliding rod $b^2$, the resistances of which are practically zero, to the guide $d$. Therefore, the alteration of the resistance in a current between the binding screw $c^1$ and the guide $d$ is proportional to a displacement of the glass wedge $a$.

In Fig. 1 the binding screw $c^1$ and the guide $d$ are put in a circuit which receives current of constant tension from a battery $e$. An amperemeter $f$ provided with a distance scale and a resistance box $g$ for adjustment are placed into the circuit. The resistances of the connecting lines, shown heavy in the drawing, are infinitesimal as compared with the resistance of the wire $c$. If in this arrangement the glass wedge $a$ is displaced and thereby the resistance in the circuit is altered, the strength of the current alters in inverse proportion, the amperemeter shows, therefore, a quantity proportional to the distance to be measured.

In the example shown in Fig. 2 the parts between the binding screw $c^1$ and the guide $d$ form a branch of a Wheatstone bridge. A resistance $h$ is connected with the binding screw $c^1$ and a resistance $i$ with the guide $d$, the resistances forming each an adjacent branch of the bridge, while the opposite fourth branch is composed in similar manner as the first branch. Between two binding screws $k^1$ and $k^2$ a resistance wire $k$ is drawn, along which can slide a pulley $l$ fixed on a guide rod $l^1$. The guide rod $l^1$ slides in a guide $m$, which is in conducting connection with the resistance $h$; the binding screw $k^2$ is connected with the resistance $i$. Next the wire $k$ there is an equally divided scale $n$, on which plays an index $l^2$ fixed to the bearing of the pulley $l$. A galvanometer $o$ is put into the zero line of the bridge between the guides $d$ and $m$ the galvanometer being developed as a double acting relay. For this purpose it is provided at both sides of its index with contacts $o^1$ and $o^2$, which are connected with the outer binding screws $p^1$ and $p^2$ of an electromotor $p$ which can turn to both sides. The middle binding screw $p^3$ of the motor $p$ is connected with a battery $o^3$, the other pole of which is connected up with the index of the galvanometer $o$. On the axis of the motor $p$ a toothed wheel $p^4$ is mounted, gearing with a rack $q$, which again is rigidly connected with the guide rod $l^1$ bearing the pulley $l$. The whole arrangement of the bridge is put into the circuit of a battery by means of the binding screws $c^1$ and $k^2$. The resistances of the connecting line shown heavy in the drawing are infinitesimal as compared with the resistances $h$ and $i$ and the resistances of the wires $c$ and $k$. This arrangement effects that with each displacement of the glass wedge $a$ the resistance in the wire $k$ is always set automatically to a quantity which is inverse proportional to the quantity of the resistance in the wire $c$. For as soon as a displacement of the glass wedge $a$ alters the resistance in the wire $c$, there will be current in the zero line of the bridge and according to the direction of the current one of the contacts $o^1$ or $o^2$ of the galvanometer is closed. The motor $p$ therefore turns in one sense or the other and thus displaces by means of the rack $q$ and the guide rod $l^1$ the pulley $l$ on the wire $k$ so long until the bridge is again without current, that is to say until the resistance of the wire $k$ has again reached a quantity which is inverse proportional to the quantity of the resistance in the wire $c$. Therefore the length of the part of the wire $k$ under current is a quantity proportional to the distance to be measured and the equally divided scale $n$ can be numbered direct according to the distance.

I claim:

1. The combination with a telemeter adapted to present to an observer two images of an object, the distance of which is to be measured, of a measuring device movably fitted within the said telemeter and adapted to effect a mutual displacement of the said two images, the movement necessary for bringing the said measuring from its infinite-position to the position pertaining to the distance of the said object being essentially proportional to the quantity of the angle of triangulation at the said object, a current source, an indicating instrument and a variable electric resistance, the said current-source, the said indicating instrument and the said resistance being connected together by a Wheatstone bridge, a branch of which is formed by the variable resistance, while the branches adjacent to the said branch have constant resistance and the branch opposite to the said branch is adjustable, the said measuring device being coupled with the said resistance in such a manner that the resistance alters in proportion to the movement of the measuring device.

2. The combination with a telemeter adapted to present to an observer two images of an object, the distance of which is to be measured, of a measuring device movably fitted within the said telemeter and adapted to effect a mutual displacement of the said two images, the movement necessary for bringing the said measuring from its infinite-position to the position pertaining to the distance of the said object being essentially proportional to the quantity of the angle of triangulation at the said object, a current-source, an indicating instrument and a variable electric resistance, the said current-source, the said indicating instrument and the said resistance being connected together by a Wheatstone bridge, a branch of which is formed by the variable resistance, while the branches adjacent to the said branch have constant resistance and the branch opposite to the said branch is adjustable, the zero line of the bridge containing a relay adapted to actuate a device increasing or diminishing the resistance of the said opposite branch, the said measuring device being coupled with the said resistance in such a manner that the resistance alters in proportion to the movement of the measuring device.

OTTO EPPENSTEIN.

Witnesses:
 PAUL KRÜGER,
 RICHARD HAHN.